US008570981B2

(12) United States Patent
Aziz et al.

(10) Patent No.: US 8,570,981 B2
(45) Date of Patent: Oct. 29, 2013

(54) HANDOVER METHOD BETWEEN A PREFERRED BASE STATION AND ALTERNATIVES BASE STATIONS

(75) Inventors: Danish Aziz, Stuttgart (DE); Anton Ambrosy, Tiefenbronn (DE)

(73) Assignee: Alcatel Lucent, Paris (FR)

( * ) Notice: Subject to any disclaimer, the term of this patent is extended or adjusted under 35 U.S.C. 154(b) by 188 days.

(21) Appl. No.: 13/265,419

(22) PCT Filed: Mar. 30, 2010

(86) PCT No.: PCT/EP2010/054153
§ 371 (c)(1),
(2), (4) Date: Oct. 20, 2011

(87) PCT Pub. No.: WO2010/121885
PCT Pub. Date: Oct. 28, 2010

(65) Prior Publication Data
US 2012/0039181 A1    Feb. 16, 2012

(30) Foreign Application Priority Data

Apr. 20, 2009  (EP) .................................. 09158269

(51) Int. Cl.
*H04W 36/30*  (2009.01)
(52) U.S. Cl.
USPC ......... 370/332; 455/432.1; 455/437; 455/438
(58) Field of Classification Search
USPC ............ 370/310.2, 328–339, 349; 455/422.1, 455/432.1, 436–444
See application file for complete search history.

(56) References Cited

U.S. PATENT DOCUMENTS

| 6,728,540 | B1 | 4/2004 | Desantis et al. | |
|---|---|---|---|---|
| 7,818,006 | B2 * | 10/2010 | Kim et al. | 455/436 |
| 2004/0176094 | A1 * | 9/2004 | Kim et al. | 455/438 |
| 2005/0096051 | A1 * | 5/2005 | Lee et al. | 455/438 |
| 2006/0227744 | A1 | 10/2006 | Metke et al. | |
| 2008/0153495 | A1 * | 6/2008 | Ogami et al. | 455/436 |
| 2011/0281581 | A1 * | 11/2011 | Brandt et al. | 455/427 |
| 2012/0039181 | A1 * | 2/2012 | Aziz et al. | 370/241 |
| 2012/0087338 | A1 * | 4/2012 | Brandt et al. | 370/331 |

FOREIGN PATENT DOCUMENTS

EP     1 909 521 A    4/2008

OTHER PUBLICATIONS

"3GPP TS 36.300 V8.5.0 (May 2008) 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," XP002532523, pp. 1-134, May 1, 2008.

(Continued)

*Primary Examiner* — Hoon J Chung
(74) *Attorney, Agent, or Firm* — Fay Sharpe LLP

(57) ABSTRACT

The invention relates to methods of using a trainable software module used in the handover procedure employing the location based information for the self optimization of wireless communication networks, in particular for the self optimization of cellular mobile networks. Embodiments of the invention address the problems of radio link failures and rapid handovers immediately after transferring a wireless appliance from one base station apparatus to the other at certain cell border locations by evaluating which base station apparatus a wireless appliance should have its wireless connection transferred to using either a database or a trainable software module.

12 Claims, 10 Drawing Sheets

(56) References Cited

OTHER PUBLICATIONS

3GPP RAN2: "3$^{rd}$ Generation Partnership Project; Technical Specification Group Radio Access Network; Evolved Universal Terrestrial Radio Access (E-UTRA): Radio Resource Control (RRC); Protocol Specification (Release 8)," XP002546641, pp. 1-204, Apr. 2009.

3GPP RAN3: "3$^{rd}$ Generation Partnership Project; Technical Specification Group Radio Access Network; Evolved Universal Terrestrial Radio Access Network (E-UTRAN); X2 Application Protocol (X2AP) (Release 8)," XP002546612, pp. 1-102, Apr. 2009.

Mouly M. et al.: The GSM System for Mobile Communications,: GSM System for Mobile Communications; Comprehensive Overview of the European Digital Cellular Systems, XP002127743; pp. 396-412; Jan. 1, 1992.

Alcatel-Lucent: "Location Based Cell Border Information Share During Handover," 3GPP TSG-RAN WG3#64 R3-091295, XP002546613, pp. 1-3, May 4-8, 2009.

International Search Report for PCT/EP2010/054153 dated Jun. 7, 2010.

* cited by examiner

HANDOVER METHOD BETWEEN A PREFERRED BASE STATION AND ALTERNATIVES BASE STATIONS

FIELD OF THE INVENTION

The invention relates to the self optimization of wireless communication networks, in particular to the self optimization of cellular telephone networks.

BACKGROUND OF THE INVENTION

When wireless appliances such as mobile terminals are passed from one cell to another there can be problems with radio coverage at the boundary between cells. There are situations in real network environments where handovers to target cells shall be avoided at specific border locations. Such situations occur e.g. when a mobile terminal moves immediately after handover into a coverage hole of the target cell and no rapid handover can be executed to a new neighbor cell.

For example, when a mobile terminal is transferred to a new cell the terminal can suddenly enter a region where the radio connection with the new cell is lost. In another example, a mobile terminal can be successfully transferred to a new neighbor cell in case of predefined handover conditions are fulfilled, i.e. normally to a cell with the strongest reported signal, and then quickly move to a region where the new connection becomes weak enough that the connection needs to be handed over again to the old or another neighbor cell.

SUMMARY OF THE INVENTION

Embodiments of the invention provide for a method of operating a first base station, a computer program product for operating the first base station, a method of operating a second base station apparatus, and a computer program product for operating a second base station apparatus in the independent claims. Embodiments of the invention are described in the dependent claims.

Embodiments of the invention address the aforementioned problem by evaluating which base station apparatus a wireless appliance should have its wireless connection transferred to using either a database or a trainable software module. In some embodiments, the network performs better as successive radio failures or rapid handovers increase the amount of data used for the database or for training the trainable software module.

The technical problem to be solved is based on the usage of a self-detection and self-optimization mechanism in wireless networks, especially for 3GPP ($3^{rd}$ Generation Partnership Project) LTE (Long Term Evolution) mobile access networks, to increase the system performance, to minimize handover failures and even avoid non suitable handovers. Embodiments of the invention may also apply to other wireless networks such as: IEEE 802.16 (WIMAX) or 3GPP2 (CDMA2000).

The best existing solutions does not consider scenarios where abrupt handover failures occur for mobile terminals in a target base station immediately after the source base station has received a successful handover confirmation from the target base station. The terms base station and cell can be used as synonyms. 3GPP LTE specified the possibility that a source base station can prepare multiple neighbor cells as candidates for handovers of a terminal. However, the preparations will be cancelled for all other neighbors when the target base station confirms a successful handover. Another possibility is the evaluation of "UE history information" information elements which is specified in 3GPP TS 36.413 and TS 36.423. In this case the base stations transmit the last visited cell information like the visit times of a certain mobile terminal in the handover request message. However, this information can only help in case of successive handovers but not for an unexpected abrupt handover failure especially caused at a specific cell border location.

Embodiments of the invention may improve the quality of the wireless communication connection in environments where a mobile terminal remains only a short time in a target cell and then quickly performs successive handover to a new neighbor cell especially for cases when problems occur at specific cell border locations.

The radio conditions in the overlap area of two or more neighbor cells may differ at, different locations at the border area. It may be suitable to handover a mobile terminal from one cell to another at one location of the border area whereas it may be unsuitable at another location of the same border area. In order to detect problematic handover locations at the border area of neighbor cells, base stations which are involved in handover procedures of mobile terminals shall exchange border location based information. For example by using the LTE specified "UE History Information" information element which is included in the "Handover Request" message. This information shall include either cell identifiers and signal strength measurements of neighbor cells reported by mobile terminals towards the source cell/base station which can be mapped on the location of mobile terminals or/and other location based information like beamforming parameters, e.g. in terms of angles, used by the source cell or/and the coordinates of the involved mobile terminals, if available. The exchange of the cell identifiers and the corresponding measured signal strengths can be based on all detected neighbor cells or at least only such neighbor cells for which a certain threshold has been reached, i.e. on the basis of strongest cells. It shall be also possible to exchange reported signal strength values together with the corresponding cell identifiers or only a ranking of identifiers of the strongest cells.

When the target base station has detected problems in handovers at some specific location of cell border, it can reject further requested handovers. For example by using a LTE specified "Handover Preparation Failure" message, which could also include the cause for the rejection e.g. "handover recommended to another neighbor cell" enhanced by a specific parameter like the Physical Cell identifier or Cell Global identifier of the preferred cell for handover. The rejection will be transmitted after having analyzed that mobile terminals moving into a certain border area are always lost in a coverage hole of the target cell or they immediately handed over towards one of the listed neighbor cells.

A wireless appliance is defined herein as any communication device which established at least a two way wireless communication with a device capable of receiving the wireless communication connection. Examples of a wireless appliance includes a cell phone, a handheld radio, and any computing device able to connect to a wireless network. The general term used for wireless appliance in wireless networks is "mobile terminal".

A base station apparatus is defined herein as a device adapted for establishing a wireless communication connection with a wireless appliance and for providing the wireless appliance access to a communication network. For example the communication network can be the global wireless/wireline communication network, public land mobile/fixed network or the'world wide web.

A signal quality report is defined herein as a report sent from a wireless appliance to a serving base station apparatus that contains information that can be used to assess the quality or strength of connections between the wireless appliance and a collection of base station apparatuses including the serving base station apparatus. The quality rating of a wireless communication connection is a value which ranks how well a particular wireless communication channel is expected to perform. A higher quality rating is defined herein as meaning that the wireless communication channel has a better connection. This means that the wireless communication channel has a stronger more robust radio connection which enables data transmissions at higher data rates. Higher data loss or even call drops can be avoided when using the better wireless connection. If the signal quality report gives a rating of the absolute strength of a wireless connection then it is the so called Reference Signal Received Power (RSRP). The ratio of the received power with respect to the source power, which is also known as the Reference Signal Received Quality (RSRQ) can also be used. The rating indicates which kind of modulation scheme can be used to minimize the loss of data or information packets. Information which indicates the position of the wireless appliance relative to each of the set of base station apparatuses can also be used by the source base station apparatus on the basis of the signal quality report which indicates a kind of fingerprint. Another alternative is the transmission of absolute coordinates by the wireless appliance by using global navigation satellite system data.

eNB is an acronym for "evolved Universal Terrestrial Radio Access Network Node B" and is an embodiment of a base station apparatus. UE is an acronym for User Equipment and is equivalent to a wireless appliance. RLF is an acronym for Radio Link Failure, HO is an acronym for Handover. RRC is an acronym for Radio Resource Control. RCC messages are used amongst others for the establishment, connection, and release of wireless communication connections.

A trained evaluation module is a trainable software module. One embodiment of a trained evaluation module is adapted for selecting a base station apparatus to transfer a wireless appliance to using a signal quality report and/or information which identifies the location of wireless apparatus. Another embodiment of a trained evaluation module is adapted for accepting or rejecting the transfer of a wireless appliance using a signal quality report and/or information which identifies the location of a wireless apparatus. A trained evaluation module can be implemented using a trainable pattern recognition module. A trainable pattern recognition module can be implemented by using a variety of different methods. Examples of different methods or algorithms that could be used are: Principal Component Analysis, Neural Network, CN2 algorithm, C4.5 algorithm, Iterative Dichotomiser 3 (ID3), nearest neighbor search algorithm, naive Bayes classifier algorithm, Holographic Associative Memory, or perception learning algorithm. Training data can be generated by a self-learning mechanism based on specific cell border locations under consideration of successive communication failures or rapid handover requests. Training data may also be generated manually or with a simulation. Manually created training data and/or simulated training data may be useful when the network first begins operational mode. The trained evaluation module may also be implemented as and/or comprise a database.

The trained evaluation module can be implemented at a single site that each of the base station apparatus connect to. For instance the base station apparatuses can connect via a computer network to a central computer which controls the handover of the wireless appliance to successive base station apparatuses. The trained evaluation module can also be distributed between the different base station apparatuses. If the trained evaluation modules are distributed they may either cooperate or operate independently. If they cooperate, then they may pass messages between them and may share database or training data. If they operate independently, then each base station apparatus may generate training data using the communication failures and/or the information of rapid handovers that each is aware of.

The invention provides for a method of operating a first base station apparatus for transferring a wireless communication connection with a wireless appliance from the first base station appliance to one of the second base station apparatuses. The set of second base station apparatuses comprises at least a preferred base station base station apparatus. The method comprises receiving and an alternative a signal quality report from the wireless appliance. The signal quality report can comprise a variety of information. A signal quality report is defined herein as any information which can be used to evaluate the quality of a connection between a wireless appliance and reported base station apparatuses and which can also be used to map on the location of the mobile terminal. This can contain measures of the strength of the signal between the wireless appliance and the base station apparatuses, and it can also contain information relating the position of the mobile terminal. For example the RSRP reference signal receive power or the RSRQ, reference signal receive quality can be used. The strength of a reference signal can be measured and reported by a mobile terminal. The location can be reported using GNSS or global navigation satellite system data. An example of a GNSS system is the so called GPS or global positioning system. The signal quality report can also contain information on the location and velocity of the wireless appliance. It can also contain information on the location and the direction of travel. The signal quality report comprises a quality rating of the connection between the wireless appliance and each of the second base station apparatuses as well as the first base station apparatus. The signal quality report is used to evaluate how well a potential connection would be and to decide what connection to make. The method further comprises selecting the preferred base station using the quality rating of each of second base station apparatuses compared to the signal quality of the first base station apparatus.

The method further comprises sending a first transfer request to the preferred base station apparatus. The first transfer request comprises the signal quality report. The signal quality report that is contained within the first transfer request may contain the full data that was received by the first base station, or the data may be condensed or summarized. For example the signal quality report within the first transfer request may have information on several base station apparatuses if they are not a candidate for transfer if their power or quality rating is below a certain threshold. The first base station may also perform calculations on the signal quality report or a substitution of physical cell identifiers by cell global identifiers. These calculations could be sent instead of the raw data from the signal quality report. The method further comprises receiving a first transfer request reply from the preferred base station apparatus. At this point a message has been sent from the first base station to the preferred base station apparatus.

The preferred base station then sends a reply message to inform the first base sta tion whether the transfer should commence or should be cancelled. The first transfer request reply comprises either a transfer acknowledgement message or a transfer cancel message. The transfer acknowledgement message informs the first base station to proceed with transferring the wireless communication connection to the preferred base station. The transfer cancel message informs the first base station apparatus to not proceed with transferring the wireless communication connection to the preferred base station. In this case communication with an alternative base station is initiated in order to transfer the wireless communication connection to the alternative base station apparatus. The method further comprises sending a first connection reconfiguration request to the wireless appliance if the transfer request reply comprises the transfer acknowledgement message. The first connection reconfiguration request informs the wireless appliance that the wireless communication connection will be transferred to the preferred base station apparatus. The method further comprises receiving a first release command from the preferred base station apparatus if the first connection reconfiguration request was sent. This is a message from the preferred base station apparatus to the first base station apparatus that tells the first base station apparatus that communication has been successfully established between the preferred base station apparatus and the wireless appliance. The method further comprises terminating the corresponding communication connections according to the wireless appliance if the first release command is received. At this point the wireless communication connection has been successfully transferred from the first base station apparatus to the preferred base station apparatus. The preferred base station apparatus can be determined in a number of different ways. Typically reported RSRP values are used to select the preferred base station apparatus and to rank each of the set of alternative base station apparatuses.

The method further comprises sending a second transfer request to the alternative base station apparatus if the transfer request reply comprises a transfer cancel message. At this step the first base station apparatus is making a connection with the alternative base station apparatus in an effort to transfer the wireless communication connection from the first base station apparatus to the alternative base station apparatus. The method further comprises receiving a second transfer request reply from the alternative base station apparatus if the second transfer request was sent. The second transfer request reply comprises either a transfer acknowledgement message or a transfer cancel message. The method further comprises sending a second connection reconfiguration request to the wireless appliance if the second transfer request reply comprises the transfer acknowledgement message. The second connection reconfiguration request instructs the wireless appliance to shift the wireless communication connection from the first base station apparatus to the alternative base station apparatus. The method further comprises receiving a second release command from the alternative base station appliance if the second communication reconfiguration request was sent. The method further comprises terminating the corresponding communication connections according to the wireless appliance if the second release command is received.

In another embodiment, the first transfer request reply specifies which of the second base stations is the alternative base station. This embodiment is advantageous, because the preferred base station apparatus can have a database or a trained evaluation module which is able to determine the best second best base station to transfer the wireless communication connection of the wireless appliance to.

In another embodiment, the connection between the alternative base station and the us has the second highest quality rating. This embodiment is advantageous because the quality rating can then be used to select directly the alternative base station.

In another embodiment the connection between the preferred base station and the wireless, apparatus has the highest quality rating. This embodiment is advantageous, because the quality rating can be used to determine the preferred base station apparatus.

In another embodiment the preferred base station apparatus is selected using a trained evaluation module. The trained evaluation module is adapted to be trained using training data. The training data is defined herein as any data or examples used to train a trainable software module.

In another embodiment, if the first transfer request reply comprises a transfer cancel message the first transfer request also comprises training data. The method further comprises the step of updating the trained evaluation module with the training data in the first transfer request reply. This is advantageous, because the system can use the connections between the first and preferred base station apparatuses to improve the efficiency in which a good connection is found.

In another embodiment, if the first transfer request reply comprises a transfer cancel message the first transfer request comprises a cause value indicating the reason for the transfer cancel message.

In another embodiment if the first transfer request reply comprises a transfer cancel message the first transfer request comprises a base station apparatus identifier that identifies the alternative base station apparatus.

In another embodiment, the method further comprises the steps of generating a set of training data using the signal quality report and the first transfer request reply. The method further comprises updating the trained evaluation module using a set of training data. This embodiment is advantageous, because if the first transfer reply request indicates that the transfer of the wireless appliance to a preferred base station is rejected, the trained evaluation module can be trained to not do this again.

In another aspect, the invention provides for a computer program product comprising machine executable instructions for performing the method of any one of the preceding claims on a base station apparatus. The base station apparatus comprises a computer system, a microprocessor, and/or a microcontroller. This is advantageous, because the machine executable code can be used for automating the transfer procedure.

In another aspect, the invention provides for a method of operating a second base station apparatus for receiving the transfer of a wireless communication connection with a wireless appliance from a first base station appliance. The method comprises receiving a first transfer request from the first base station apparatus. The first transfer request comprises a signal quality report A signal quality report is generated using cell identifiers and/or a quality rating of the connection between the wireless apparatus and each of the base station apparatuses within communication range of a wireless appliance. The cell identifiers and/or the quality rating of the connection between the wireless apparatus and each of the base stations has been previously described.

The method further comprises generating a first transfer request reply using a trained evaluation module using the first transfer request. The first transfer request reply comprises either a transfer acknowledgement message or a transfer cancel message. The trained evaluation module has been previously discussed. In embodiments where there is a trained evaluation module in both the first base station and the second base station, the trained evaluation modules can be identical and on the same computer system or they can be distributed across the individual base station apparatuses. The method further comprises sending the first transfer request reply to the first base station. The method further comprises receiving a first connection reconfiguration complete message from the wireless appliance if the first transfer request reply comprises a transfer acknowledgement message. The first connection reconfiguration complete message is a message from the wireless appliance that lets the second base station know that the wireless appliance has reconfigured itself properly. The method further comprises establishing the wireless communication connection with the wireless appliance if the first connection reconfiguration complete message has been received. At this point the wireless communication connection has been successfully transferred from the first base station apparatus to the second base station apparatus. The method further comprises sending a context release message to the first base station apparatus if the first connection reconfiguration complete message was received.

It is also possible that the first transfer request reply contains a transfer cancel message. In this case the wireless communication connection of the wireless appliance was not transferred to the second base station apparatus. The transfer cancel message is used by the first base station apparatus that it should try to transfer the wire less appliance to an alternative base station apparatus.

In another embodiment, the method further comprises the step of monitoring the wireless communication connection for a predetermined period of time for a communication change event. A communication change event is defined herein as any event which is undesirable for a wireless communication connection. Examples would be a loss of connection, a deterioration in the quality of the connection, for instance a loss of signal strength or the data in the signal being corrupted, or a request from the handset to transfer to another base station again rapidly. The method further comprises the step of generating a set of training data using the signal quality report and the first transfer request reply if the communication change event occurs within the predetermined time. This is advantageous, because if the communication change event occurs within the predetermined time, then it indicates that it is not advantageous to transfer the communication connection of the wireless apparatus to the second base station. In this case the training data is then used to update the evaluation module. The method further comprises the step of training the trained evaluation modules with the set of training data.

In another embodiment, the communication change event is loss of radio communication.

In another embodiment, the communication change event is the reception a second signal quality report from the wireless appliance indicating that the wireless communication connection with the wireless appliance should be transferred to a different base station apparatus. This embodiment is advantageous, because it indicates that the communication connection needs to be transferred to a different base station apparatus too quickly. The trained evaluation module can then be updated with information to prevent this from happening again.

In another embodiment, the first transfer request reply comprises a transfer cancel message.

In another embodiment, if the first transfer request reply comprises a transfer cancel message the first transfer request reply comprises a set of training data generated using the signal quality report. This is advantageous, because the training data can be sent to a trained evaluation module in the first base station apparatus.

In another embodiment, if the first transfer request reply comprises a transfer cancel message the first transfer request comprises a cause value indicating the reason for the transfer cancel message.

In another embodiment, if the first transfer request reply comprises a transfer cancel message the first transfer request comprises a base station apparatus identifier that identifies the alternative base station apparatus.

In another embodiment, if the first transfer request reply comprises a transfer cancel message the first transfer request reply specifies an alternative base station apparatus to transfer the wireless communication connection to. This embodiment is advantageous, because the optimum base station apparatus to transfer the wireless communication connection to may not necessarily have the next highest quality or signal strength rating.

In another embodiment the signal quality report comprises global navigation satellite system data. This embodiment is advantageous, because the position of the wireless apparatus can be used to evaluate the best base station apparatus to transfer to.

In another embodiment the signal quality report comprises measurement data of the beam forming method for example in terms of angles used by the first base station for the wireless communication method. This embodiment is advantageous, be cause the beam forming method can be used to approximate the location of the wireless appliance.

In another embodiment, the trained evaluation module is adapted for using the signal quality report to map a location and direction of travel of the wireless application with the purpose of generating the first transfer reply request. This is advantageous because the location and the direction of travel can be used to identify regions where using the quality rating of the connection may be misleading as to which is the best base station apparatus to transfer the wireless communication connection to.

In another aspect the invention provides for a computer program product comprising machine executable instructions for performing the method of operating a second base station apparatus for receiving the transfer wireless communication connection with the wireless appliance from the first base station appliance.

In another aspect, the invention provides for a base station apparatus adapted for performing any one of the embodiments of the method of the invention.

BRIEF DESCRIPTION OF THE DRAWINGS

In the following preferred embodiments of the invention will be described, by way of examples only, and with reference to the drawings in which.

DETAILED DESCRIPTION

Like numbered elements in these figures are either identical elements or perform the same function. Elements which have been discussed previously will not necessarily be discussed in later figures if the function is identical.

Figure 1:
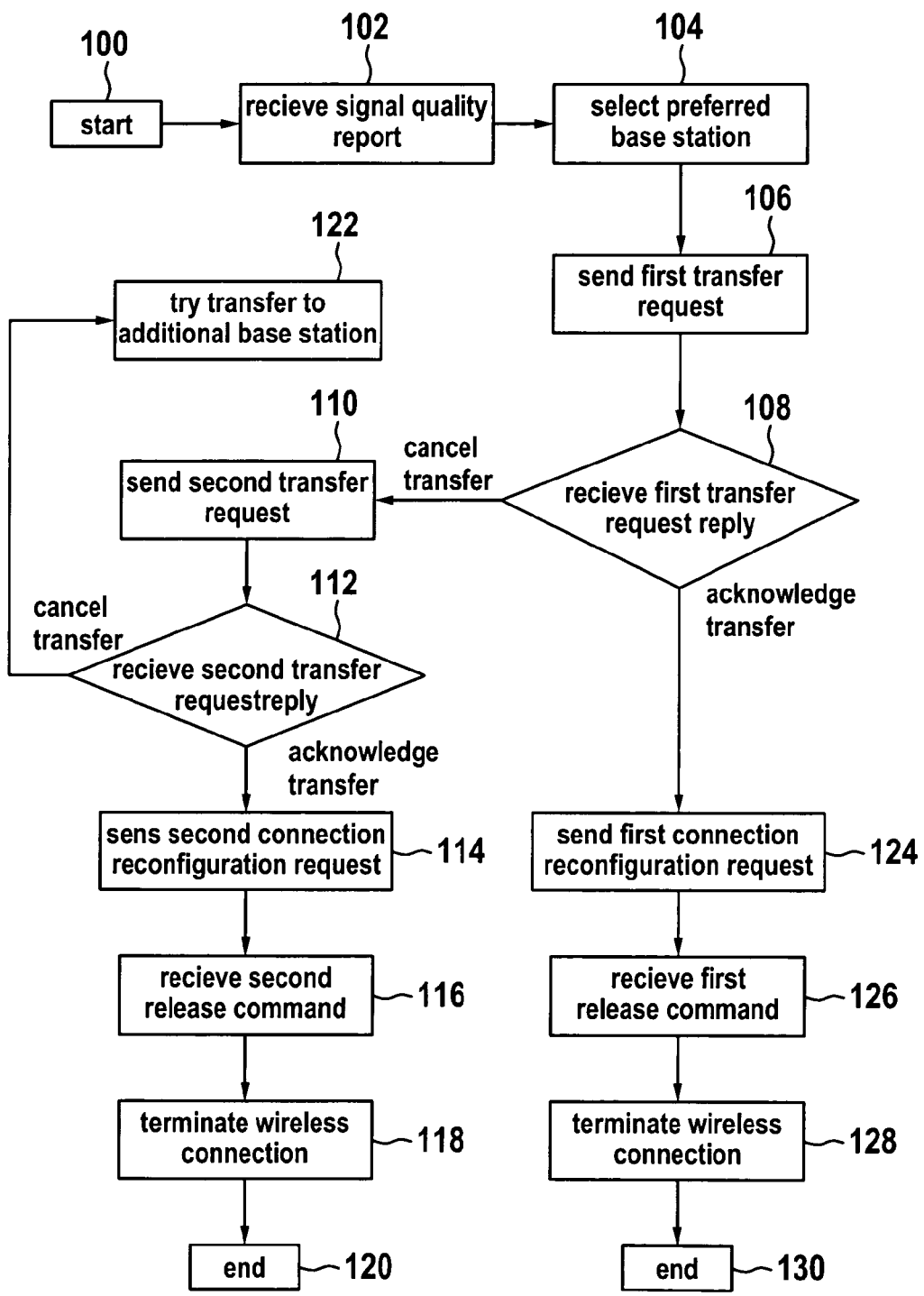
FIG. 1 shows a flow chart for an embodiment of a method for operating a first base station.

FIG. 1 shows a flowchart for an embodiment of a method of operating a first base station for transferring a wireless communication connection with the wireless appliance to one of a set of second base station apparatuses. Step 100 is the start of the method. Step 102 is receiving the signal quality report. The signal quality report contains a quality rating or a measure of the connection between the wireless appliance and each of the second base station apparatuses. This can be a measure of the position of the wireless apparatus relative to the different second base station apparatuses, or it can also be a measure of the signal strengths or the ratio of the power with respect to the source power. In step 104 a preferred base station is selected. The preferred base station can be selected using the quality rating of each of the second base station apparatuses. The next step is step 106 which is sending a first transfer request to the preferred base station apparatus. The first transfer request may specify a location identifier which provides information for mapping the location of the wireless apparatus. The location identifier may specify the location of the wireless apparatus, or it may be a mapping. For example the signal strengths of the various base station apparatuses within range combined with a prior knowledge of these signal strengths could be used to construct such a mapping.

Step 106 is a request by the first base station to transfer the wireless appliance to the preferred base station apparatus. In the next step the first transfer request reply is received from the preferred base station. In either a transfer acknowledgement message or a transfer cancel message is received with the first transfer reply request In the case of a transfer acknowledgement message, the wireless communication is transferred from the first base station to the preferred base station. In this the next step is step 124 which is to send a first connection reconfiguration request to the wireless appliance. The next step is step 126 which is to receive a first release command from the preferred base station apparatus. This is an indication that the preferred base station has established the wireless communication connection with the wireless appliance. In the next step the first base station terminates the wireless communication connection with the wireless appliance. The termination of a wireless communication connection may include the termination of the connection to the communication network that the base station apparatus provides to the wireless appliance. Step 130 is after this and this is an end of the method. Step 108 was to receive the first transfer request reply. In the case that a transfer cancel message is received, the next step is 110 which is to send a second transfer request. The second transfer request may also specify a location identifier which provides information for mapping the location of the wireless apparatus. The second transfer request is sent to the alternative base station apparatus. The next step is step 112 which is to receive a second transfer request reply. As with the first transfer request reply 108, the second transfer request reply 112 has two possibilities also. Again these are receiving either a transfer acknowledgement message or a transfer cancel message. In the case of a cancel transfer message, the first base station will try to transfer to an additional base station apparatus 122. In the case of an acknowledged transfer message, the next step is 114 which is to send a second connection reconfiguration request. The next step is step 116 which is to receive a second release command from the alternative base station. The next step is step 118 which is to terminate the wireless connection with the wireless appliance 118. Again, the termination of a wireless communication connection may include the termination of the connection of the communication network that the base station apparatus provides to the wireless appliance. At this point the wireless communication connection has been successfully transferred to the alternative base station apparatus.

Figure 2:
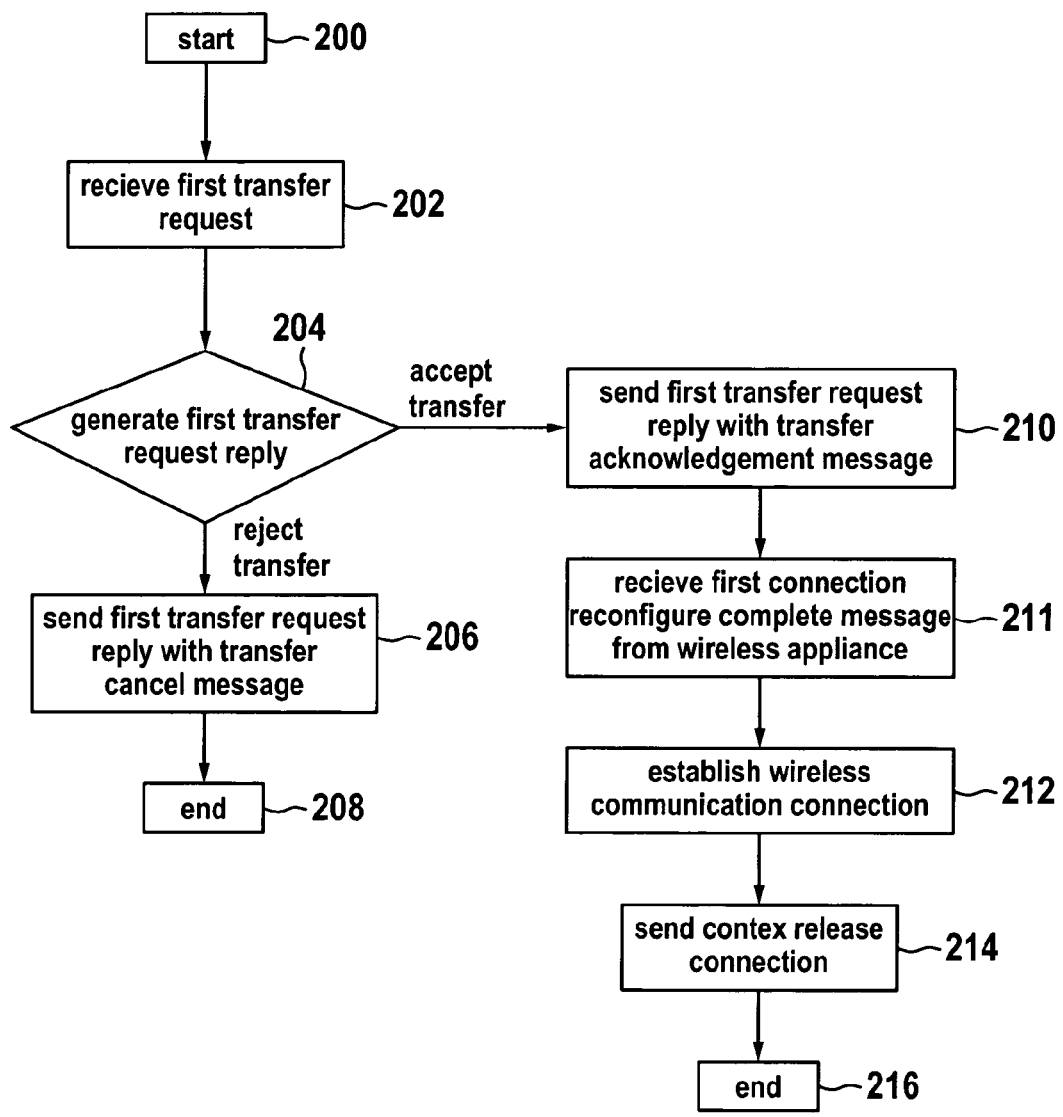
FIG. 2 shows a flowchart for an embodiment of a method for operating a second base station which has been selected by the first base station for the transfer of the wireless connection.

FIG. 2 shows an embodiment of the method of operating a second base station apparatus in the form of a flowchart. In the transfer of a wireless communication connection with a wireless appliance from a first base station appliance is shown in this flowchart. Step 200 is the start of the method. Step 202 is to receive a first transfer request from the first base station apparatus. The first transfer request may comprises a signal quality report and the signal quality report as previously described is generated using a quality rating of the connection between the wireless apparatus and each of the base station apparatuses within communication range of the wireless appliance. The first transfer request may also comprise a a location identifier which provides information for mapping the location of the wireless apparatus. The next step is step 204 which is to generate a first transfer request reply. The first transfer request reply is generated using a training evaluation module using the first transfer request. The first transfer request reply comprises either a transfer acknowledgement message or a transfer cancel message. In the case of a transfer acknowledgement message, the next step is to send the first transfer request reply with transfer acknowledgement message to the first base station 210. The next step is step 212 which is to establish a wireless communication connection with the wireless appliance. The next step is step 214 and this is to send a context release message to the first base station. After step 214, the next step is 216 which is the end of the method. However, if the first transfer request reply contained a transfer cancel message, then the next step after step 204 is step 206. Step 206 is sending the first transfer request reply with the transfer cancel message. The first transfer request reply may comprise a cause value which indicates the reason for the transfer cancel message. The first transfer request may also comprise a base station apparatus identifier which may be used to identify an alternative base station apparatus to transfer the wireless appliance to. At this point the second base station has rejected the transfer of the wireless appliance. The next step is step 208 which is the end of the method.

Figure 3:
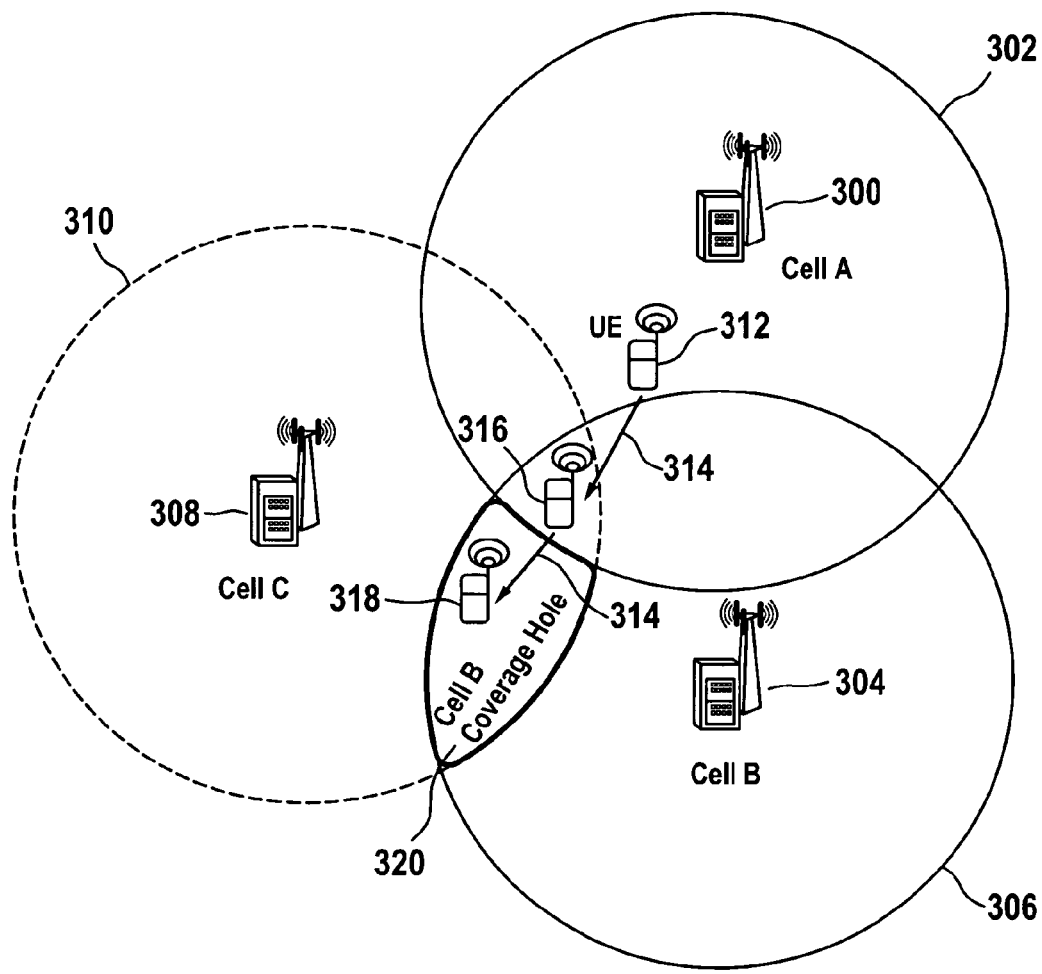
FIG. 3 illustrates the situation where radio link failure occurs just after the hand off of a wireless appliance from one base station apparatus to another at a certain cell border location.

FIG. 3 illustrates the situation where a wireless appliance moves from one base station apparatus to a second base station apparatus through positions 312, 316, 318. FIG. 3 shows base station apparatus A 300, base station apparatus B 304, and base station apparatus C 308. Line 302 is the boundary of the range of wireless coverage of base station apparatus A 300. Line 306 is the boundary of coverage of base station apparatus B 304. Line 310 is the boundary of coverage for base station apparatus C. In this illustration the base station apparatuses are eNBs. Initially the wireless appliance is at position 312. It then moves towards the boundary of base station apparatus A's coverage 302. At position 316 the appliance is transferred to the control of base station apparatus B 304. When the wireless appliance enters region 320, the wireless appliance at 318 then loses communication with base station apparatus B 304. This figure illustrates the necessity of being able to accurately predict radio link failures when the relative position of the wireless apparatus is known. If the coverage hole 320 is known in advance by base station apparatus A 300, then the wireless appliance 312, 316, 318 could have been transferred to base station apparatus C 308 instead of base station apparatus B 304.

In the embodiments shown in FIGS. 3 through 10, the wireless appliance is a mobile terminal or UE. The base station apparatuses are the cells served by the eNBs.

In FIG. 3, the border location can be differentiated, if the handover preparation request received by the target cell (base station apparatus B 304) from the source cell (base station apparatus A 300) contains additional information in terms of approaching UE coordinates, used beam-forming parameters of source cell, signal strength of other available candidate cells or ranking of available strongest neighbor cells (like cell C 308 as the second strongest cell). Hence the location based information can be comprised of any other information that provides the hint about the specific location at the border. By using that information, the target cell which has a problematic cell border area can avoid the handovers coming from the source cell only at that border location.

An improved solution can be achieved when the source cell receives a qualitative feedback from the target cell, i.e. when the target cell includes in the handover preparation failure message a cause value, e.g. "handover recommended to another neighbor cell" and even better also information which candidate cell should be selected for a handover, e.g., by indicating the cell identifier, e.g. Physical Cell ID or Cell Global ID. Then the source cell can directly request a handover towards the cell recommended by the rejecting target cell. Later on when an additional self-learning algorithm is implemented in the source cell which analyses the received feedbacks from the target cell in combination with UE measurement reports/signal quality reports, the source cell is able to decide on handovers directly to some other suitable neighbor cell.

FIG. 3 shows an assumed network scenario based on 3 base station apparatuses (cells) 300, 304, 308. The coverage area of these cells overlaps in a certain region 316 and a coverage hole 320 of one of these cells may be caused by a topological environment, e.g. shadowed by a mountain or a big building. Coverage holes can exist in real deployments even after an extensive planning phase where a radio access network is optimized in terms of radio conditions.

Consider a mobile terminal (UE=User Equipment or wireless appliance) 312 that moves from cell A 300 towards cell B 304 and performs a successful handover with cell B 304 as shown in FIG. 3. However, just after a successful handover indicated by cell B 304 towards cell A 300, the UE 318 falls into the coverage hole 320 of cell B 304 and faces a Radio Link Failure (RLF). After the RLF and after going through the standard procedure, the UE 318 connects itself to cell C 308. If cell B 304 learns that it has a coverage hole near the border of cell A 300 and UEs 312 coming from there face always or in most cases RLFs, it should cancel handover requests arising from cell A 300. However, there is no border location information available according to UEs 312, 314 moving from cell A 300 towards cell B 304. Therefore, this would not be a perfect solution as the coverage hole does not affect the complete common border area of cell B 304 with cell A 300 as shown in FIG. 3. UEs coming from the other parts of the cell border between cell A 300 and cell B 304 do not face such problems. Hence if location based border information is exchanged between the cell A 300 and cell B 304 during the handover, cell B 304 can decide on the basis of a self-learning algorithm to reject dedicated handover requests coming from cell A 300.

In the example scenario shown in FIG. 3, the border location can be differentiated if the handover preparation request received by cell B 304 from cell A 300 contains information about cell C 308 as the second strongest cell. With the help of self-learning algorithm in cell B 304, cell B 304 can analyze that the handovers coming from cell A 300 with cell C 308 as the second strongest mostly face RLFs. Thus if cell A 300 sends handover preparation requests to cell B 304 for the UEs which include cell C 308 as the second strongest cell, cell B 304 will reject those handovers. If cell A 300 prepares handover for the UEs which do not include cell C 308 as second strongest cell, cell B 304 will accept those handovers.

Figure 4:
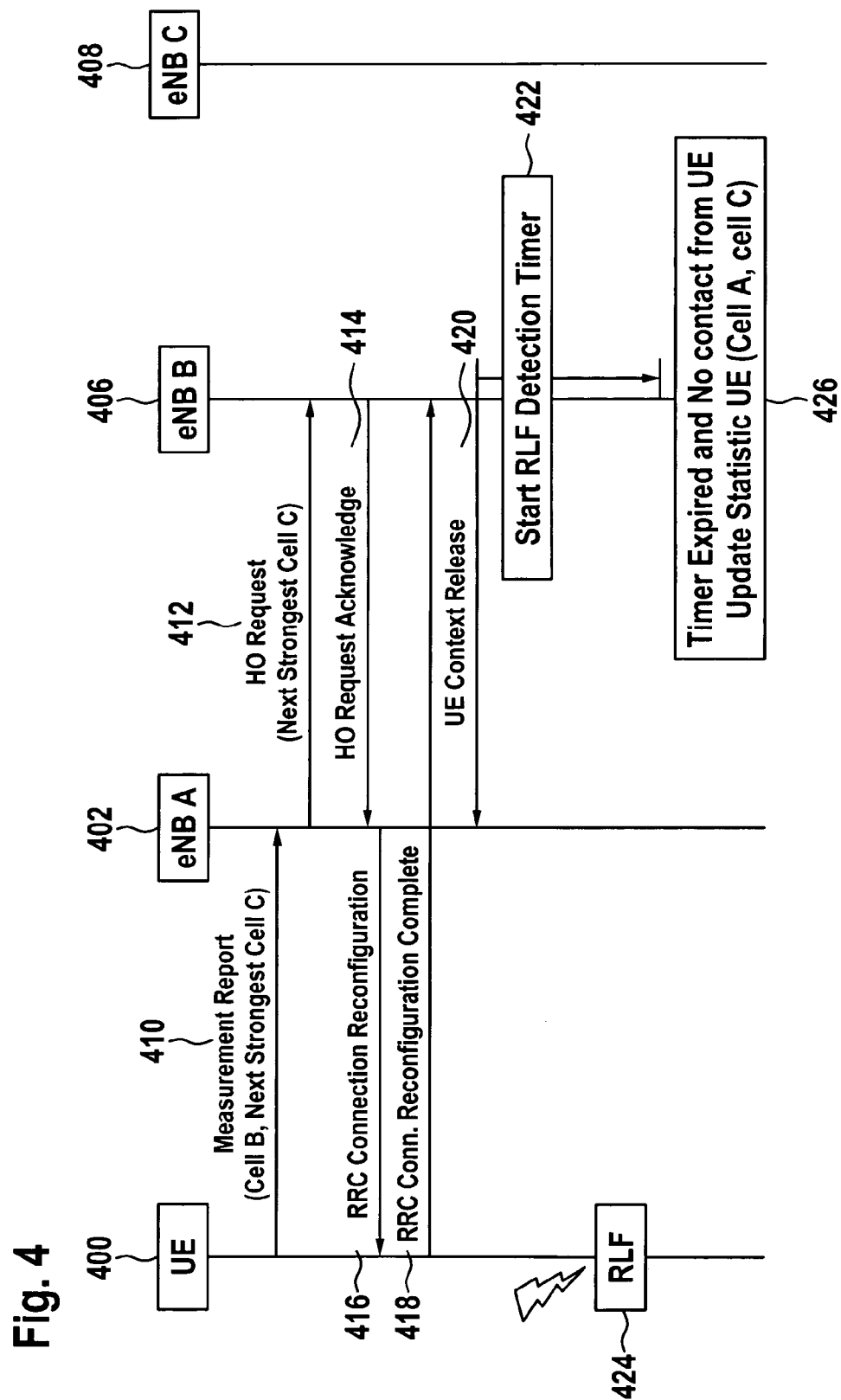
FIG. 4 illustrates the flow of messages for handover procedure between the wireless appliance and the corresponding base stations and how a radio link failure can be detected for a certain cell border location using a timer in the second base station apparatus.

FIG. 4 shows the detection of a radio link failure 424 using a detection timer 422. FIG. 4 shows the communications between a wireless appliance 400, base station apparatus A 402, base station apparatus B 406, and base station apparatus C 408 with the help of flow of messages. The first communication is from the wireless appliance 400 to the base station apparatus A 402. A measurement report 410 showing that base station apparatus B is the strongest signal with base station apparatus C 408 having the second strongest signal. A handover request 412 is then sent from base station apparatus A 402 to base station apparatus B 406. In step 414 a handover request acknowledge is sent from base station apparatus B to base station apparatus A 402. Base station apparatus A 402 then sends an RRC connection reconfiguration message 416 to the wireless appliance 400. The wireless appliance 400 then sends an RRC connection reconfiguration to complete message 418 to the base station apparatus B 406. Base station B 406 then sends a wireless appliance context release message 420 to base station apparatus A 402. At this time a radio link failure detection timer 422 is started. During the time the detection timer 422 is active a radio link failure 424 event occurs. 426 indicates that the timer expired and there was no contact from the wireless appliance 400. At this point the statistics are updated in base station apparatus B 406 and training data is generated to indicate that the wireless appliance 400 should have been transferred to base station apparatus C 408 instead of base station apparatus B 406. A statistical test may be performed on the failure to determine if training data should be generated. For instance if just a single failure occurs it may be due to the operator and/or the positioning of the wireless appliance. If multiple failures occur and the number of failures is statistically significant then the training data is generated.

FIG. 4 shows a possible message exchange during the handover process between UE 400, eNB (name of a base station specified by 3GPP LTE) of cell A 402 and eNB of cell B 406 which are facing the situation represented by FIG. 3. This message flow is based upon the specified handover procedure in 3GPP TS 36.300 (only relevant messages are shown in FIG. 2). Cell B 406 can learn about the problematic border location with cell A 402, e.g. by setting a special timer.

Figure 5:
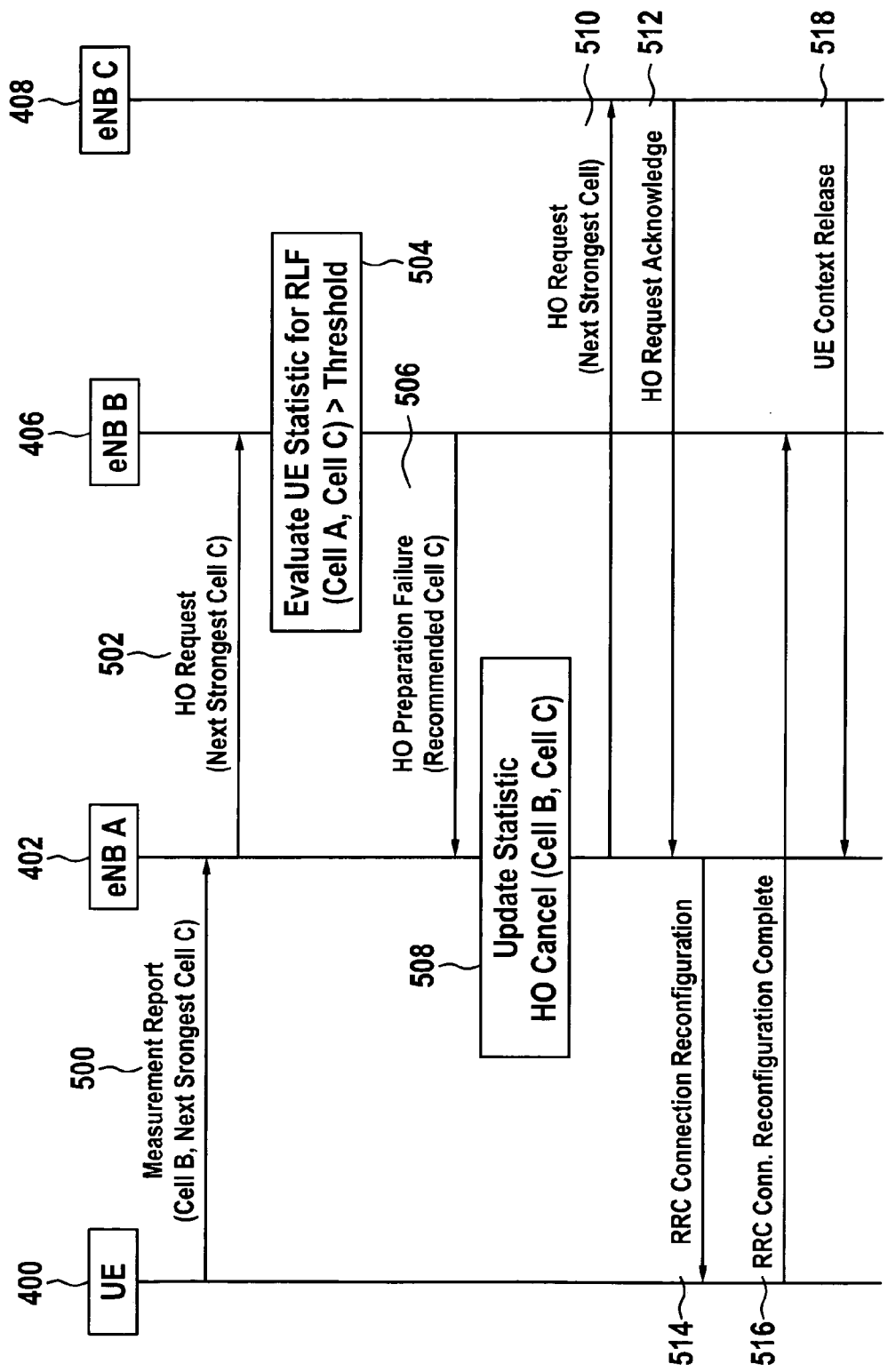
FIG. 5 illustrates the flow of messages for a transfer of a wireless communication connection being rejected by a second base station apparatus due to a previous radio link failure at a certain cell border location.

FIG. 5 illustrates the rejection of the transfer of a wireless appliance 400 from base station apparatus A 402 to base station apparatus B 406 by base station apparatus B 406. In this figure there is base station apparatus A 402, base station apparatus B 406, and base station apparatus C 408, and wireless appliance 400. In a first step the wireless appliance 400 sends a measurement report 500 indicating that base station apparatus B has the strongest signal and that base station apparatus C has the second strongest signal 500 to base station apparatus A 402. Base station apparatus A 402 then sends a handover request 502 to base station apparatus B 406. The handover request 502 also indicates that the next strongest base station apparatus signal is from base station apparatus C 408. In step 504 the statistics are evaluated using trained evaluation module in step 504. The trained evaluation module decides that the wireless appliance 400 should be transferred to base station apparatus C 408 instead. Base station apparatus B then sends a handover preparation failure message 506 to base station apparatus A 402. The base station apparatus A 402 receives this message and updates the statistics 508 concerning this handover cancel. This information is then used to generate training data which is used to train the trained evaluation module. Base station apparatus A 402 then sends a handover request to base station apparatus C 408. Base station apparatus C 408 then sends a handover request acknowledgement message 512 to base station apparatus A 402. Base station apparatus A then sends an RRC connection reconfiguration message 514 to the wireless appliance 400. The wireless appliance 400 then sends an RRC connection reconfiguration complete 516 message to base station apparatus C 408. Base station apparatus C 408 then sends a wireless appliance context release message 518 to base station apparatus A 402.

In FIG. 5, it is shown that the cell B 406 detects the problem and rejects the handovers by sending a handover preparation failure message to cell A 402 including a recommendation to perform handover to cell C 408. Then cell A 402 will accept this recommendation and attempts handover preparation towards cell C 408.

Figure 6:
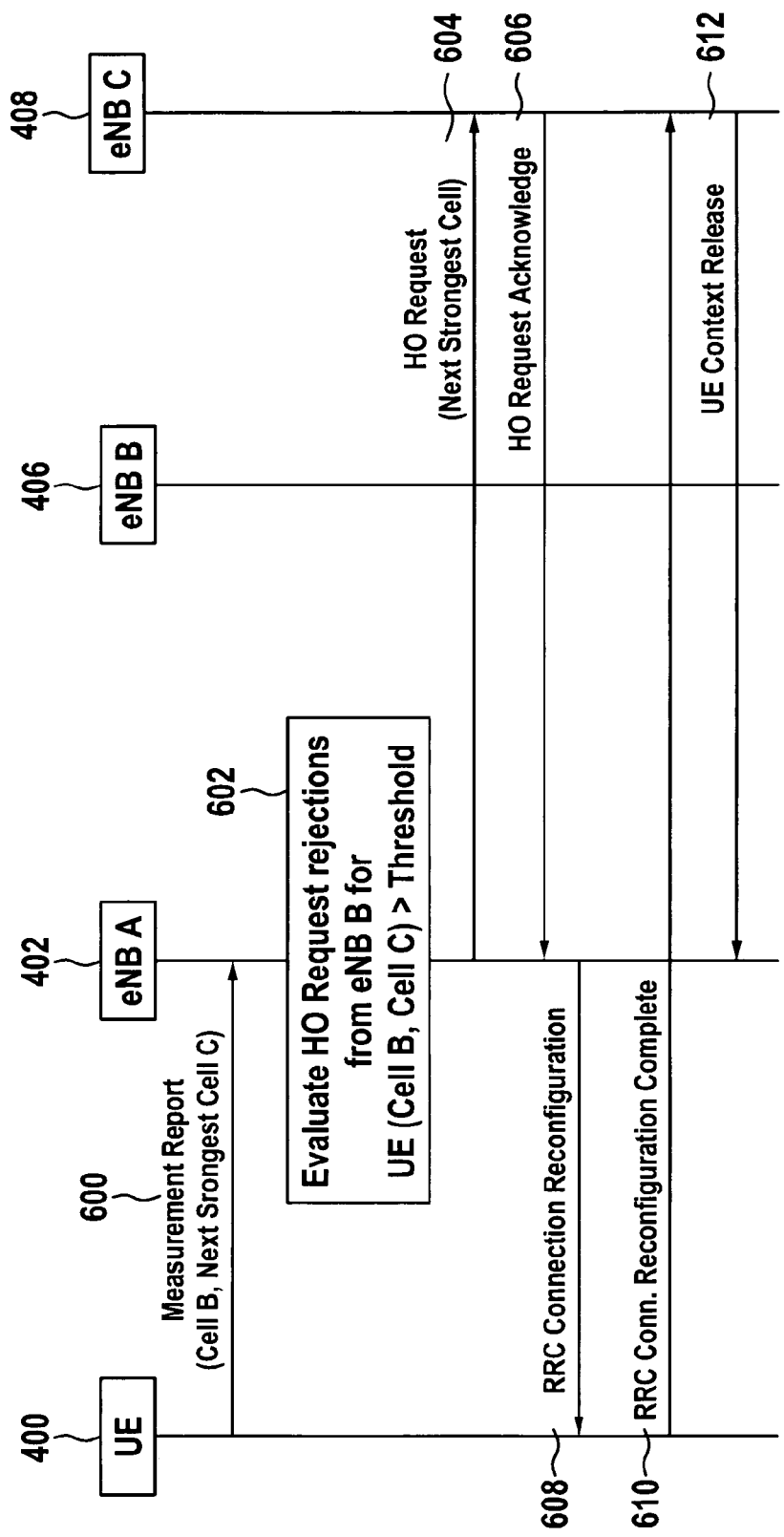
FIG. 6 illustrates the flow of messages where a first base station apparatus selects the second base station apparatus, which does not has the highest signal quality rating, with the help of handover rejections received from the second base station caused by previous radio link failures for a certain cell border location.

FIG. 6 illustrates the selection of base station apparatus C 408 instead of base station apparatus B 406 (although B is the strongest cell) for the transfer of a wireless communication connection between a wireless apparatus 400 and base station A 402. In the first step a measurement report is sent from the base station apparatus 400 to base station A 402. In step 602 the handover request is evaluated by a trained evaluation module. The trained evaluation module rejects the transfer to base station B 406 and instead initiates the procedure of transferring the wireless appliance 400 to base station apparatus C 408. In the next step base station apparatus A 402 sends a handover request message 604 to base station apparatus C 408. Base station apparatus C 408 then sends a handover request acknowledge 606 to base station apparatus A 402. Base station apparatus A then sends an RRC connection reconfiguration message 608 to the wireless appliance 400. The wireless appliance then sends an RRC connection reconfiguration complete message 610 to base station apparatus C 408. The base station apparatus C then sends a wireless appliance context release message 612 to base station apparatus A 402.

Moreover cell A 402 also learns from the feedbacks of cell B 406. In FIG. 6, it is shown that when UE 400 sends handover request 604 to cell A 402 with cell B 406 as handover candidate and cell C 408 as the second strongest cell, cell A 402 detects the problem and sends a handover preparation request directly to cell C 408 instead of cell B 406.

Figure 7:
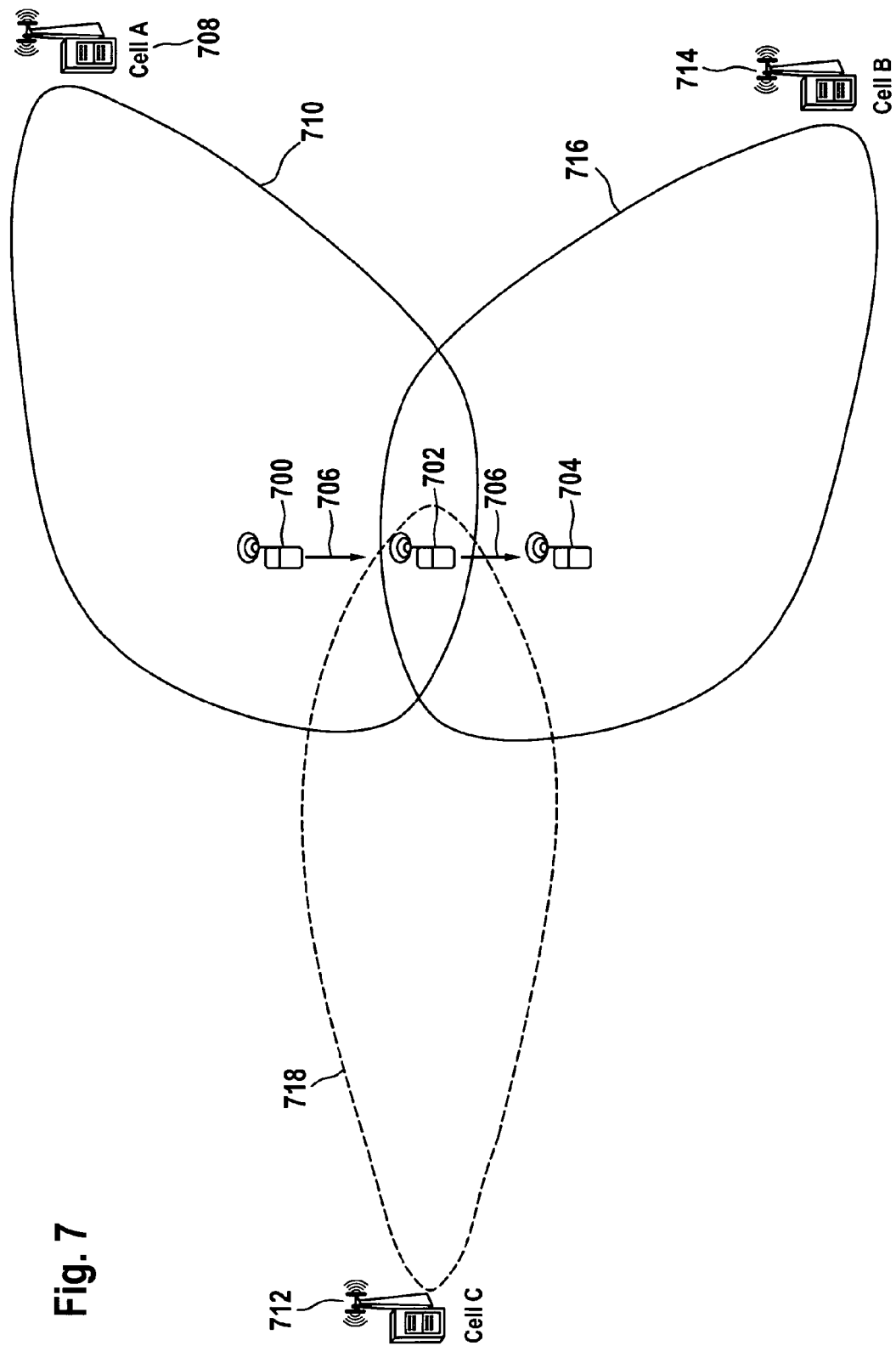
FIG. 7 illustrates a situation where rapid handovers occur just after a wireless appliance has been transferred between two base station apparatuses at a certain cell border location.

The location based information during handover preparation and the corresponding feedbacks transmitted between two cells can also be used for other approaches, e.g. to avoid short visit times caused by UEs 400 moving through hot spots or by UEs 400 moving through a small transit cell as shown in FIG. 7. These situations are also very common in a typical urban deployment.

FIG. 7 is an illustration of how a wireless appliance 700, 702, 704, can; briefly enter radio range of a base station apparatus and then quickly leave it again. Base station apparatus A 708 is shown with the boundary of its wireless coverage 710. Base station apparatus B 714 is shown with the boundary of its wireless coverage 716. Base station apparatus C 712 is shown with the boundary of its wireless coverage 718. The wireless appliance 700, 702, 704 is shown in several different positions. Initially the wireless appliance 700 is only within radio range of base station apparatus A 708. As the wireless appliance 700 travels along path 706, it briefly enters a region where it is located within radio range of base station apparatus C 712. However, it quickly exits this region and goes to position 704 where it is out of range of base station apparatus C 712. In this case, if the wireless appliance 700, 702, 704 is transferred to base station apparatus C 712, it would result in the wireless appliance 700, 702, 704, having to be transferred rapidly to base station apparatus B 714. In this situation it is the best to save the network signaling overload if the wireless appliance 700, 702, 704, is transferred directly to base station apparatus B 714 instead.

In the embodiment shown in FIG. 7, the wireless appliance 700, 702, 704 is a cell phone or UE. The base station apparatuses 708, 714, 712 are cellular telephone cells.

Such another approach is shown in FIG. 7 based on an assumed network scenario including 3 cells. A part of the coverage area of cell A 710, cell B 716 and cell C 718 overlaps in such a way that cell C 712 appears to be strongest for a very small region in this overlap. Consider a UE 700, 702, 704 that moves from cell A 708 in the direction of cell B 714 and pass through this overlap area 702 as shown in FIG. 7. The UE 700, 702, 704 will perform handover from cell A 708 to cell C 712 and then from cell C 712 to cell B 714. However, the visit time of the UE 700, 702, 704 in cell C 712 is very short. Just after coming to cell C 712 it makes successive handover to cell B 714. If cell A 708 prepares the handover to cell C 712 with the additional information of cell B 714 as the second strongest cell, cell C 712 can learn this situation and can reject the handovers. Later on, cell A 708 can directly perform handovers to cell B 714 or UEs 700, 702, 704 moving in that region.

Figure 8:
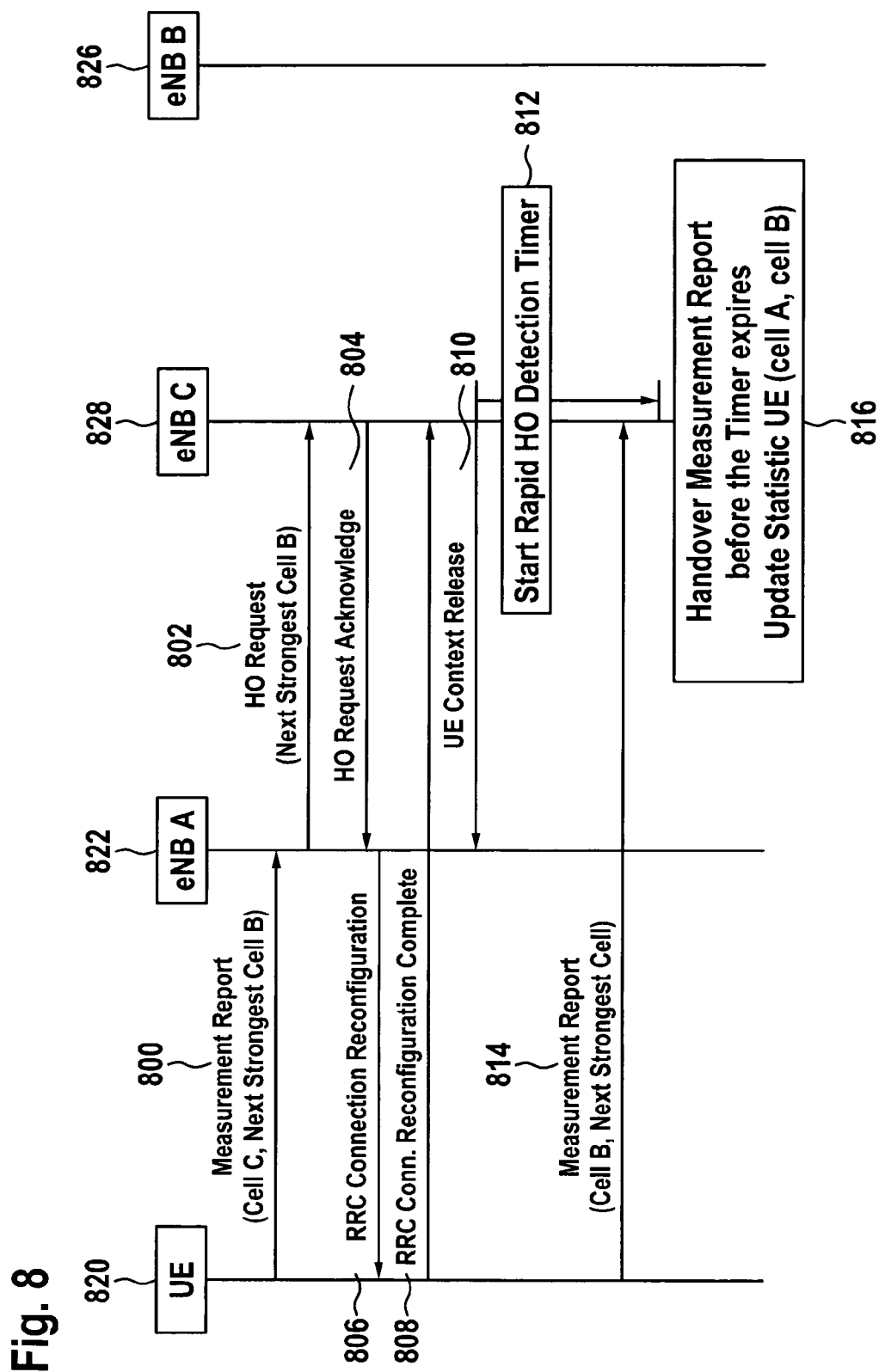
FIG. 8 illustrates the flow of messages and how a rapid handover can be determined for a certain cell border location using a timer.
Figure 9:
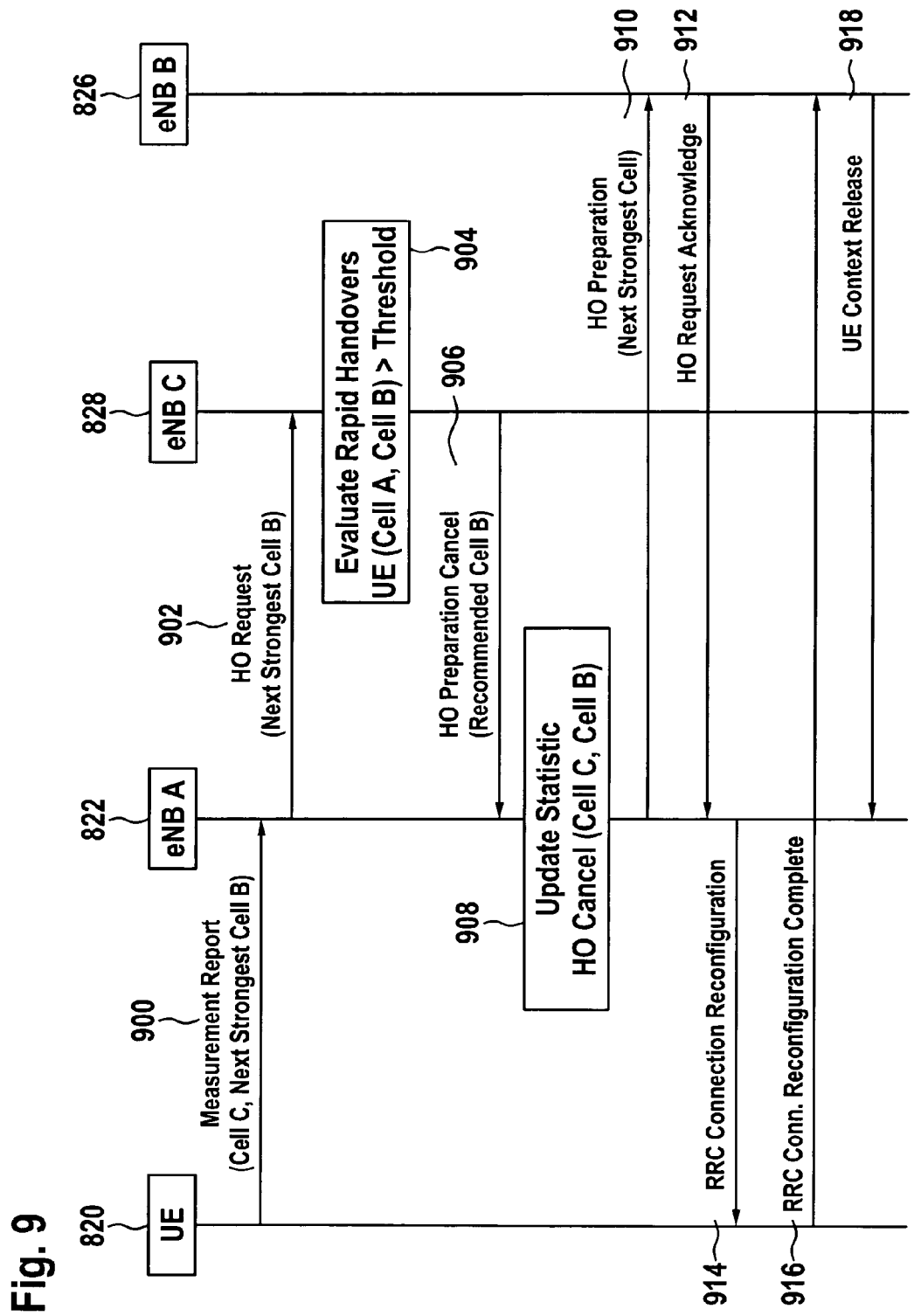
FIG. 9 illustrates the flow of messages where a wireless communication connection being rejected by a second base station apparatus due to a rapid handovers at a certain cell border location.
Figure 10:
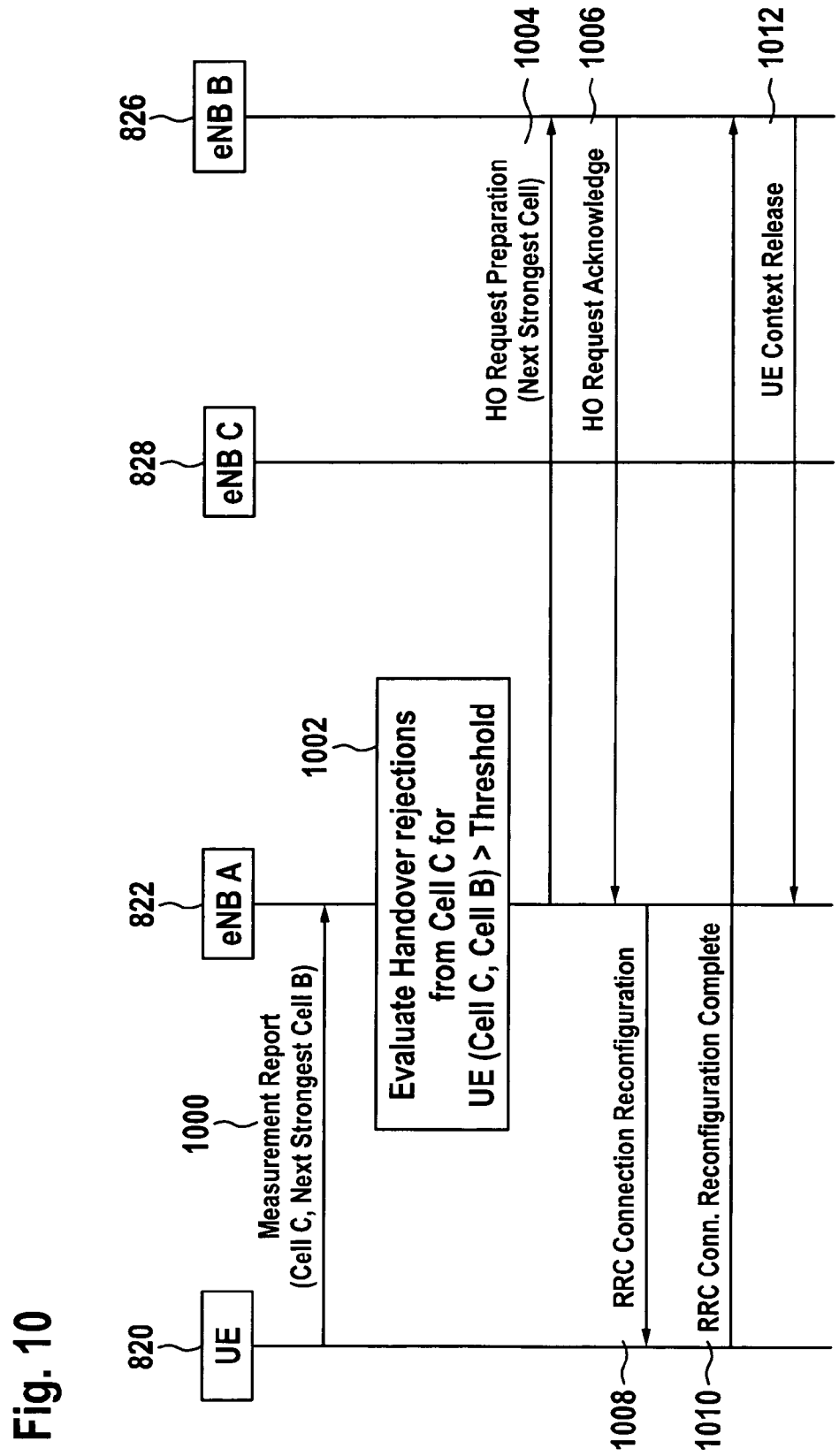
FIG. 10 illustrates the flow of messages where a first base station apparatus selects the second base station apparatus, which does not has the highest signal quality rating, with the help of handover rejections received from the second base station caused by previous rapid handovers at a certain cell border location.

The possible handover messages flow diagrams between the UE, eNBs of cell A, cell C and cell B for the detection and rectification of this problem by cell C and cell A are shown in FIGS. 8, 9 and 10.

FIG. 8 shows an example of using a detection timer 812 to detect when a rapid handoff failure occurs. In step 800 the wireless appliance 820 sends a measurement report 800 to base station apparatus A 822. Measurement report 800 indicates that base station apparatus C has the strongest signal and that the next strongest signal is from base station apparatus B. Base station apparatus A 822 then sends a handover request 802 to base station apparatus C 828. The handover request 802 contains information that the next strongest base station apparatus signal is from base station apparatus B 826. Base station apparatus C 828 then sends a handover request acknowledge message 804 to base station apparatus A 822. Base station apparatus A 822 then sends an RRC connection reconfiguration message 806 to the wireless appliance 820. The wireless appliance 820 then sends an RRC connection reconfiguration complete message 808 to base station apparatus C 828. Base station apparatus C then sends a wireless appliance context release message 810 to base station apparatus A. At the same time a rapid handover detection timer 812 is started. During the duration of this timer 812, a measurement report 814 is sent from the wireless appliance 820 to the base station apparatus C 828. This measurement report 814 indicates that the strongest signal is from base station apparatus B. As this rapid handover was detected, the trained evaluation module is trained using this information.

FIG. 9 shows the rejection of a handover from base station apparatus A to base station apparatus C 828 that is rejected by the trained evaluation module of base station apparatus C 828. The first step is step 900 in which a measurement report is sent from the wireless appliance 820 to base station apparatus A 822. The measurement report 900 contains information that the strongest signal from the base station apparatuses is from base station apparatus C 828, with the next strongest signal being from base station apparatus B 826. Base station apparatus A 822 then sends a handover request 902 to base station apparatus C 828. The handover request 902 contains information that the next strongest signal is from base station apparatus B 826. The trained evaluation module of base station apparatus C 828 evaluates the rapid handovers in step 904. The trained evaluation module then decides that it is better to transfer the wireless appliance 820 to base station apparatus B 406. In step 906 base station apparatus C 828 sends a handover preparation cancel message 906 to base station apparatus A 822. Within the handover preparation cancel message 906 is a recommendation that the wireless appliance 820 be transferred to base station apparatus B 826. Base station apparatus A 822 then updates its own trained evaluation module in step 908. Base station apparatus A 822 then sends a handover preparation message 910 to base station apparatus B 826. Base station apparatus B 826 then sends a handover request acknowledge message 912 to base station apparatus A 822. Base station apparatus A 822 then sends an RRC connection reconfiguration message 914 to wireless appliance 820. Wireless appliance 820 then sends an RRC connection reconfiguration complete message 916 to base station apparatus B 826. Base station apparatus B 826 then sends a wireless appliance context release message 918 to base station apparatus A 822.

FIG. 10 illustrates the selection, of base station apparatus B 826 instead of base station apparatus C 828 (although C is the strongest cell) for the transfer of a wireless communication connection between a wireless apparatus 820 and base station A 822. In step 1000 wireless appliance 820 sends a measurement report 1000 message to base station apparatus A 822. The measurement report 1000 contains information that base station apparatus C 828 has the strongest signal and that base station apparatus B 826 has the second strongest signal. The trained evaluation module of base station apparatus A 822 then evaluates the measurement report 1000 in step 1002. The trained evaluation module then determines that due to rapid handovers the wireless appliance 820 should instead be transferred to base station apparatus B 826. In the next step base station apparatus A 822 sends a handover request preparation signal 1004 to base station apparatus B 826. Base station apparatus B 826 then sends a handover request acknowledge message 1006 to base station apparatus A 822. Base station apparatus A 822 then sends an RRC connection reconfiguration message 1008 to wireless appliance 820. Wireless appliance 820 then sends an RRC connection reconfiguration complete message 1010 base station apparatus B 826. Base station apparatus B 826 then sends a wireless appliance context release message 1012 to base station apparatus A 820.

LIST OF REFERENCE NUMERALS

300 Base station apparatus A
302 Boundary of wireless coverage of base station apparatus A
304 Base station apparatus B
306 Boundary of wireless coverage of base station apparatus B
308 Base station apparatus C
310 Boundary of wireless coverage of base station apparatus C
312 Position of wireless appliance only within range, of base station apparatus A
314 Path of wireless appliance
316 Position of wireless appliance when transferred to base station apparatus B
318 Position of wireless appliance in coverage hole of base station apparatus B
320 Wireless communication coverage hole of base station apparatus B
400 Wireless appliance
402 Base station apparatus A
406 Base station apparatus B
408 Base station apparatus C
424 Radio link failure event
700 Position of wireless appliance only within range of base station apparatus A
702 Position of wireless appliance when briefly in range of base station apparatus C
704 Position of wireless appliance when out of range of base station apparatus C
706 Path traversed by wireless appliance
708 Base station apparatus A
710 Boundary of wireless coverage of base station apparatus A
712 Base station apparatus C
714 Base station apparatus B
716 Boundary of wireless coverage of base station apparatus B
718 Boundary of wireless coverage of base station apparatus C
820 Wireless appliance
822 Base station apparatus A
826 Base station apparatus B
828 Base station apparatus C

The invention claimed is:

1. A method of operating a first base station apparatus for transferring a wireless communication connection with a wireless appliance from the first base station apparatus to one of a set of second base station apparatuses comprising at least a preferred base station apparatus and an alternative base station apparatus wherein the method comprises:
receiving a signal quality report from the wireless appliance,
selecting the preferred base station apparatus using the signal quality report,
sending a first transfer request to the preferred base station apparatus, wherein the first transfer request comprises the signal quality report, receiving a first transfer request reply from the preferred base station apparatus, wherein the first transfer request reply comprises either a transfer acknowledgement message or a transfer cancel message, wherein the selection between the transfer acknowledgement message and the transfer cancel message is made using the signal quality report, sending a first connection reconfiguration request to the wireless appliance if the first transfer request reply comprises the transfer acknowledgement message, wherein the first connection reconfiguration request instructs the wireless appliance to shift the wireless communication connection from the first base station apparatus to the preferred base station apparatus, receiving a first release command from the preferred base station apparatus if the first connection reconfiguration request was sent, terminating the wireless communication connection with the wireless appliance if the first release command is received, sending a second transfer request to the alternative base station apparatus if the first transfer request reply comprises the transfer cancel message, receiving a second transfer request reply from the alternative base station apparatus if the second transfer request was sent, wherein the first transfer request reply comprises either the transfer acknowledgement message or the transfer cancel message, sending a second connection reconfiguration request to the wireless appliance if the second transfer request reply comprises the transfer acknowledgement message, wherein the second connection reconfiguration request instructs the wireless appliance to shift the wireless communication connection from the first base station apparatus to the alternative base station apparatus, receiving a second release command from the alternative base station appliance if the second connection reconfiguration request was sent, terminating the wireless communication connection with the wireless appliance if the second release command is received or a first internal timer expires, wherein the signal quality report comprises a quality rating of the wireless communication connection between the wireless appliance and each of the second base station apparatuses, wherein the first transfer request reply specifies which of the second base station apparatuses is the alternative base station apparatus.

2. The method of claim 1, wherein the wireless communication connection between the alternative base station apparatus and the wireless appliance has the second highest quality rating and/or wherein the wireless communication connection between the preferred base station apparatus and the wireless appliance has the highest quality rating.

3. The method of claim 1, wherein the preferred base station apparatus and/or the alternative base station apparatus is selected using a trained evaluation module which uses the signal quality report for the selection, wherein the trained evaluation module is configured to be trained using training data, and wherein the training data is any one of the following: generated by a self-learning mechanism based on specific cell border locations from successive communication failures or rapid handover requests, manually created training data, and simulated training data.

4. The method of claim 3, wherein the signal quality report comprises a location identifier for mapping the location of the wireless appliance, and wherein the trained evaluation module uses the location identifier for selecting the preferred base station apparatus and/or the alternative base station apparatus.

5. The method of claim 3, wherein if the first transfer request reply comprises the transfer cancel message the first transfer request comprises a cause value indicating the reason for the transfer cancel message and/or a base station apparatus identifier that identifies the alternative base station apparatus.

6. The method of claim 3, the method further comprising:
generating a set of training data using the signal quality report and the first transfer request reply,
updating the trained evaluation module using the set of training data.

7. A computer program product comprising a non-transitory machine readable medium embodying machine executable instructions which when executed causes a processor to perform the method of claim 1 on a base station apparatus.

8. A method of operating a second base station apparatus for receiving a transfer of a wireless communication connection with a wireless appliance from a first base station apparatus, wherein the method comprises:
receiving a first transfer request from the first base station apparatus, wherein the first transfer request comprises a signal quality report, wherein the signal quality report is generated using a quality rating of the wireless communication connection between the wireless appliance and each base station apparatus within communication range of the wireless appliance,
generating a first transfer request reply using a trained evaluation module using the signal quality report of the first transfer request, wherein the first transfer request reply comprises either a transfer acknowledgement message or a transfer cancel message,
sending the first transfer request reply to the first base station apparatus,
receiving a first connection reconfiguration complete message from the wireless appliance if the first transfer request reply comprise the transfer acknowledgement message,
establishing the wireless communication connection with the wireless appliance if the first connection reconfiguration complete message was received,
sending a context release to the first base station apparatus if the first connection reconfiguration complete message was received,
wherein if the first transfer request reply comprises a transfer cancel message the first transfer request reply comprises a base station apparatus identifier that identifies an alternative base station apparatus.

9. The method of claim 8, the method further comprising:
monitoring the wireless communication connection for a predetermined period of time for a communication change event,
generating a set of training data using the signal quality report and the first transfer request reply if the communication change event occurs within the predetermined period of time,
training the trained evaluation module using the set of training data, wherein the communications change event is any one of the following: the loss of radio communication, the reception of a second signal quality report from the wireless appliance indicating that the wireless communication connection with the wireless appliance should be transferred to a different base station apparatus, the loss of the wireless communication connection, the loss of signal strength for the wireless communication connection, and the corruption of data in the signal of the corresponding wireless communication channel.

10. The method of claim 8, wherein if the first transfer request reply comprises the transfer cancel message the first transfer request comprises a cause value indicating the reason for the transfer cancel message.

11. The method of claim 8, wherein the signal quality report comprises global navigation satellite system data which provides the location of the wireless appliance and/or wherein the signal quality report comprises measurement data of the beam forming method used by base station apparatuses for forming the wireless communication connection and/or wherein the trained evaluation module is configured for using the signal quality report to map a location and direction of travel of the wireless application for the purpose of generating the first transfer request reply.

12. A computer program product comprising a non-transitory machine readable medium embodying machine executable instructions which when executed causes a processor to perform the method of claim 8 on a base station apparatus.

* * * * *